United States Patent
Sasaki et al.

(10) Patent No.: US 9,952,368 B2
(45) Date of Patent: Apr. 24, 2018

(54) POLARIZATION CONVERSION ELEMENT AND OPTICAL DEVICE

(71) Applicant: Dexerials Corporation, Shinagawa-ku (JP)

(72) Inventors: Koji Sasaki, Shinagawa-ku (JP);
Masatoshi Sasaki, Shinagawa-ku (JP);
Nobuyuki Koike, Shinagawa-ku (JP);
Akio Takada, Shinagawa-ku (JP)

(73) Assignee: DEXERIALS CORPORATION, Shinagawa-ku (JP)

( * ) Notice: Subject to any disclaimer, the term of this patent is extended or adjusted under 35 U.S.C. 154(b) by 46 days.

(21) Appl. No.: 14/901,607

(22) PCT Filed: Jun. 27, 2014

(86) PCT No.: PCT/JP2014/067177
§ 371 (c)(1),
(2) Date: Dec. 28, 2015

(87) PCT Pub. No.: WO2014/208725
PCT Pub. Date: Dec. 31, 2014

(65) Prior Publication Data
US 2016/0370524 A1 Dec. 22, 2016

(30) Foreign Application Priority Data

Jun. 27, 2013 (JP) ................ 2013-135060

(51) Int. Cl.
*G02B 5/30* (2006.01)
*G02B 27/28* (2006.01)
(Continued)

(52) U.S. Cl.
CPC .............. *G02B 5/3083* (2013.01); *C09J 5/00* (2013.01); *G02B 27/283* (2013.01);
(Continued)

(58) Field of Classification Search
CPC ........ G02B 5/3083; G02B 27/283; C09J 5/00; C09J 2483/00; B32B 37/1284; B32B 2307/42
(Continued)

(56) References Cited

U.S. PATENT DOCUMENTS 5,986,809 A * 11/1999 Itoh ...................... G02B 27/283
348/E9.027
6,402,322 B1 * 6/2002 Aoki .................... G02B 27/283
349/9
(Continued)

FOREIGN PATENT DOCUMENTS

JP 10-90520 A 4/1998
JP 10-255313 A 9/1998
(Continued)

OTHER PUBLICATIONS

Machine Translation by https://www4.j-platpat.inpit.go.jp/eng/tokujitsu/tkbs_en/TKBS_EN_GM101_Top.action of JP 10-255313, on Apr. 29, 2017.*
(Continued)

*Primary Examiner* — Frank Font
(74) *Attorney, Agent, or Firm* — Oblon, McClelland, Maier & Neustadt, L.L.P.

(57) ABSTRACT

This invention provides a polarization conversion element that is highly resistant to the heat and light that result from increased brightness levels. In said polarization conversion element, which is provided with a polarizing beam-splitter array in which polarizing beam splitters having polarization separation layers and reflecting prisms having reflective layers are bonded together in alternation, said polarizing beam splitters and reflecting prisms are bonded together by first adhesive layers each comprising a silicone adhesive.

16 Claims, 8 Drawing Sheets

(51) Int. Cl.
*B32B 37/12* (2006.01)
*C09J 5/00* (2006.01)

(52) U.S. Cl.
CPC ........ *G02B 27/286* (2013.01); *B32B 37/1284* (2013.01); *B32B 2307/42* (2013.01); *C09J 2483/00* (2013.01)

(58) Field of Classification Search
USPC .......... 359/483.01–484.01, 618–640; 353/20
See application file for complete search history.

(56) References Cited

U.S. PATENT DOCUMENTS

| | | | |
|---|---|---|---|
| 6,404,550 B1 | 6/2002 | Yajima | |
| 6,542,298 B1 * | 4/2003 | Aoki | G02B 27/285 353/20 |
| 7,387,391 B2 * | 6/2008 | Domroese | G03B 21/14 348/750 |
| 7,553,025 B2 * | 6/2009 | Hirata | G02B 5/3058 348/338 |
| 8,749,886 B2 * | 6/2014 | Gupta | G02B 5/3041 359/489.09 |
| 8,867,131 B1 * | 10/2014 | Amirparviz | G02B 5/04 359/485.03 |
| 2001/0050815 A1 * | 12/2001 | Ishihara | G02B 5/1814 359/566 |
| 2002/0080487 A1 | 6/2002 | Yajima | |
| 2002/0089746 A1 | 7/2002 | Akitaka | |
| 2006/0221445 A1 | 10/2006 | Dizio et al. | |
| 2008/0278690 A1 * | 11/2008 | Maeda | G02B 27/285 353/20 |
| 2010/0245691 A1 * | 9/2010 | Kawamura | G02B 27/28 349/9 |
| 2012/0188471 A1 * | 7/2012 | Kobayashi | G02B 27/283 349/9 |
| 2012/0194768 A1 * | 8/2012 | Horikoshi | G02B 5/3083 349/96 |
| 2013/0215515 A1 * | 8/2013 | Kinoshita | G02B 3/0056 359/619 |
| 2016/0097936 A1 * | 4/2016 | Sasaki | C09J 183/04 362/19 |

FOREIGN PATENT DOCUMENTS

| | | |
|---|---|---|
| JP | 11-014831 A | 1/1999 |
| JP | 2008-129190 A | 6/2008 |
| JP | 2008-537163 A | 9/2008 |

OTHER PUBLICATIONS

Machine Translation by https://www4.j-platpat.inpit.go.jp/eng/tokujitsu/tkbs_en/TKBS_EN_GM101_Top.action of JP 2008-129190, on Apr. 29, 2017.*
International Search Report dated Jul. 29, 2014, in PCT/JP2014/067177 Filed Jun. 27, 2014.
Office Action dated Oct. 11, 2017, in Chinese patent application No. 201480036833.1 (w/ English translation).

* cited by examiner

POLARIZATION CONVERSION ELEMENT AND OPTICAL DEVICE

TECHNICAL FIELD

The present invention relates to a polarization conversion element that converts light having random polarization directions to light having one polarization direction, a method for manufacturing the same, and an optical device including the same.

BACKGROUND ART

In recent years, each of the devices constituting liquid crystal display apparatuses has been required to have high reliability and durability with increasing applications and functions of liquid crystal display apparatuses. For example, when a light source having a large quantity of light is used as in a transmissive liquid crystal projector, a polarization conversion element that converts natural light emitted from the light source to linearly polarized light receives strong radiation. Therefore, when the polarization conversion element has low durability, an illumination efficiency is decreased.

A polarization conversion element generally includes a polarizing-beam splitter array in which polarizing-beam splitters each having a polarization separation film and prisms each having a reflecting film are alternately bonded to each other, and a retardation plate is selectively provided on the outgoing surface of each of the polarizing-beam splitters.

Usual polarization conversion elements often use a UV (ultraviolet) curing-type adhesive as an optical adhesive for alternately bonding polarizing beam splitters and prisms to each other. Similarly, a UV curing-type adhesive is frequently used for bonding a ½ wavelength plate to the outgoing surface of each of the polarizing beam splitters.

However, polarization conversion elements using a UV curing-type adhesive quickly deteriorate with heat and light due to higher brightness of recent transmissive liquid crystal projectors and the like, thereby causing a problem with durability. For example, when burning occurs at a coating position in association with deterioration of the UV curing-type adhesive in a polarization conversion element, irradiation light is concentrated at the burning position, thereby causing a concern about a decrease in transmittance and the breakage of the element due to a high temperature.

In addition, in general, a dichroic retardation plate including a film containing an iodine-based or dye-based polymer organic material is frequently used as the retardation plate selectively provided on the outgoing surface of each of the polarizing beam splitters. A method used as a general method for producing a dichroic retardation plate includes dyeing a polyvinyl alcohol-based film with a dichroic dye such as iodine, cross-linking the film with a cross-linking agent, and then uniaxially stretching the film. The retardation plate including the polymer stretched film easily deteriorates with heat and UV light and thus has low durability. Also, since the retardation plate includes the polymer stretched film formed by stretching, this type of retardation plate generally easily contracts. In addition, the polyvinyl alcohol-based film uses a hydrophilic polymer and is thus easily deformed, particularly, under humidified conditions, and the mechanical strength as a device is weakened. Although a retardation element having an inorganic optical single crystal such as quartz or the like may be used for solving the problem, there is the problem of difficulty in increasing the size and of high raw material cost and processing cost.

CITATION LIST

Patent Literature

PTL 1: Japanese Unexamined Patent Application Publication No. 11-14831
PTL 2: Japanese Patent No. 3486516

SUMMARY OF INVENTION

Technical Problem

The present invention has been proposed in consideration of the situation described above, and an object is to provide a polarization conversion element having excellent durability to heat and light with increasing brightness, a method for manufacturing the polarization conversion element, and an optical device including the polarization conversion element.

Solution to Problem

In order to solve the problem, a polarization conversion element according to the present invention includes a polarizing beam splitter array in which first light-transmitting members each having a polarization separation layer, that transmits one of a P wave and a S wave and reflects the other, and second light-transmitting members each having a reflecting layer that reflects the other of the P wave and the S wave reflected from the polarization separation layer are alternately bonded to each other through a first adhesive layer composed of a silicone-based adhesive, the other of the P wave or the S wave incident on the incident surface being reflected to an outgoing surface from the reflecting layer; and an inorganic ½ wavelength plate selectively provided on the outgoing surface of the polarizing beam splitter array and having an obliquely deposited film composed of a dielectric material so that one of the P-wave and the S-wave is converted to the other.

Also, a method for manufacturing a polarization conversion element according to the present invention includes forming a polarizing beam splitter array by alternately bonding to each other, through a silicone-based adhesive, first light-transmitting members each having a polarization separation layer that transmits one of a P wave and a S wave and reflects the other, and second light-transmitting members each having a reflecting layer that reflects the other of the P wave or S wave; and selectively bonding, to an outgoing surface of the polarizing beam splitter array, an inorganic ½ wavelength plate that has an obliquely deposited film composed of a dielectric material and that converts one of the P-wave and the S-wave to the other.

Further, an optical device according to the present invention includes the polarization conversion element described above.

Advantageous Effects of Invention

According to the present invention, the first light transmitting members and the second light transmitting members are bonded to each other through the first adhesive layer composed of a silicone adhesive, and the inorganic ½ wavelength plate having the obliquely deposited film composed of a dielectric material is used, and thus heat resistance and light resistance can be improved.

DESCRIPTION OF EMBODIMENTS

The present invention is described in detail below with reference to the drawings in the order below.

1-1. Polarization conversion element
1-2. First adhesive layer and second adhesive layer
1-3. Obliquely deposited layer having laminated structure
1-4. Protection of side surface of inorganic ½ wavelength plate
1-5. Example 1
1-6. Example 2
1-7. Example 3
2. Method for manufacturing polarization conversion element
3. Optical device The present invention is not limited to embodiments below, and various modifications, of course, can be made within a range not deviating from the gist of the present invention. In addition, the drawings are schematic, and the dimensional ratio etc. may be different from actual ones. Specific dimensions etc. should be determined in consideration of the description below. Of course, a portion having a dimensional relation, ratio, or the like different between the drawings is contained.

1-1. Polarization Conversion Element

Figure 1:
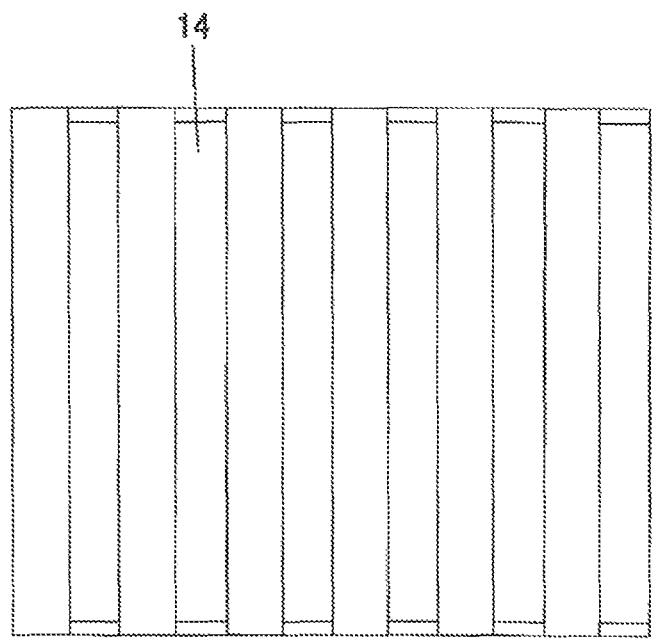
FIG. 1 is a plane view showing a polarization conversion element.
Figure 2:
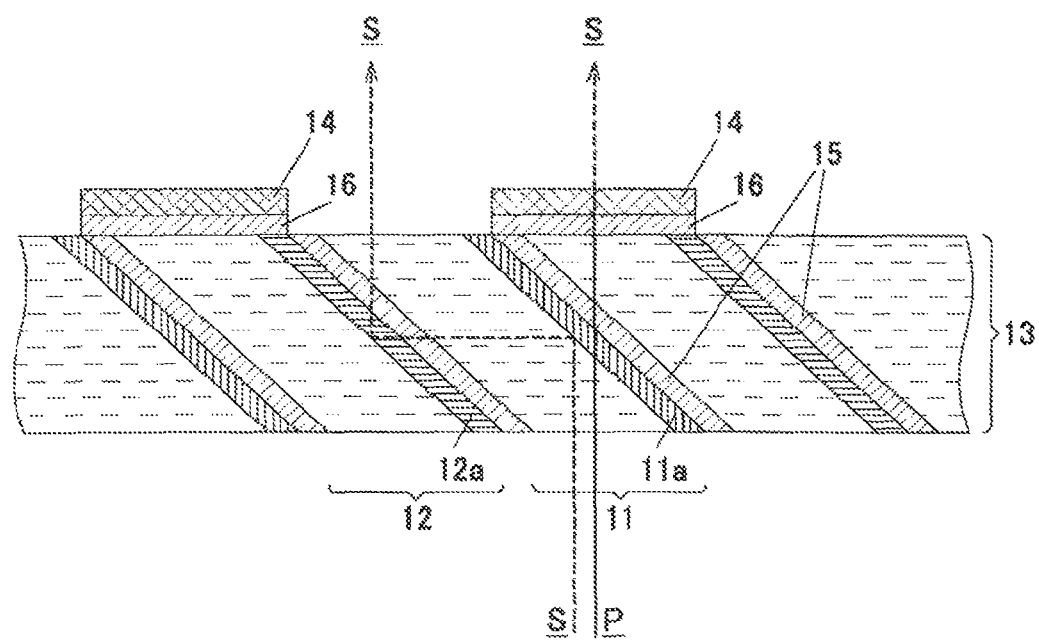
FIG. 2 is a cross-sectional view showing a polarization conversion element.

FIG. 1 and FIG. 2 are a plane view and a cross-sectional view, respectively, showing a polarization conversion element. The polarization conversion element includes a polarizing beam splitter array 13 in which polarizing beam splitters 11 each having a polarization separation layer 11a and reflecting prisms 12 each having a reflecting layer 12a are alternately bonded to each other. An inorganic ½ wavelength plate 14 is selectively provided on an outgoing surface of each of the polarizing beam splitters 11.

Each of the polarizing beam splitters 11 has the polarization separation layer 11a formed on one of the surfaces of a light-transmitting member having a parallelogram cross-section. Examples of the base material of the light-transmitting member include sapphire glass, quartz glass, soda glass, and the like. The polarization separation layer 11a has the property of transmitting one of a P-wave and an S-wave as incident light and reflecting the other. The polarization separation layer 11a is formed by, for example, laminating a dielectric film.

Each of the reflecting prisms 12 has the reflecting layer 12a formed on a light-transmitting member having a parallelogram cross-section. Examples of the base material of the light-transmitting member include sapphire glass, quartz glass, soda glass, and the like. The reflecting layer 12a has high reflectance for a specified linearly polarized light component (for example, the P-wave). The reflecting layer 12a is formed by, for example, laminating a dielectric film or using a metal film of aluminum or the like.

The polarizing beam splitter array 13 has a configuration in which the polarization separation layer 11a of each of the polarizing beam splitters 11 is bonded to the surface of each of the reflecting prisms 12 on the side opposite to the reflecting layer 12a, and the surface of each of the polarizing beam splitters 11 on the side opposite to the polarization separation layer 11a is bonded to the reflecting layer 12a of each of the reflecting prisms 12. In the polarizing beam splitter array 13, the polarization separation layer 11a and the reflecting layer 12a have a predetermined angle with the incident surface and a parallel relation therebetween. The polarizing beam splitter array 13 has a substantially rectangular shape and includes the ½ wavelength plate selectively bonded to the outgoing surface so that all polarization states of light emitted from the outgoing surface are made S-wave (or P-wave) light beam.

Also, the polarizing beam splitter array 13 has a configuration in which the polarizing beam splitters 11 and the reflecting prisms 12 are bonded to each other through a first adhesive layer 15 composed of a silicone-based adhesive. The silicone-based adhesive is, for example, dimethyl silicone, methyl rubber, or the like which has excellent heat resistance and light resistance. The configuration in which the polarizing beam splitters 11 and the reflecting prisms 12 are bonded to each other through the first adhesive layer 15 composed of a silicone-based adhesive can improve heat resistance and light resistance.

The inorganic ½ wavelength plate 14 is provided on the outgoing surface of each of the polarizing beam splitters 11 and convers one of the P-wave and the S-wave to the other. That is, the inorganic ½ wavelength plate 14 rotates by 90° the polarization direction of a specified linearly polarized light component transmitted through the polarization separation layer 11a and converts the light component to the same polarization state as the P-wave or S-wave reflected by the polarizing beam splitters 11 and the reflecting prisms 12.

Also, the inorganic ½ wavelength plate 14 has a substantially rectangular shape and is provided on the light-transmitting member of each of the reflecting prisms 12. The inorganic ½ wavelength plate 14 includes an inorganic retardation element having a single obliquely deposited layer or a plurality of obliquely deposited layers. The obliquely deposited layer contains dielectric fine particles formed by an oblique vapor deposition method. A high-refraction material such as $Ta_2O_5$, $TiO_2$, $SiO_2$, $Al_2O_3$, $Nb_2O_5$, $MaF_2$, or the like can be used for the dielectric fine particles. Thus, high durability to heat and UV light can be obtained as compared with an organic retardation element having a polymer stretched film. Also, the size can be easily increased, and the raw material cost and processing cost can be decreased as compared with a retardation element containing an inorganic optical single crystal such as quartz or the like.

The obliquely deposited layer generally has a highly porous structure in order to achieve high birefringence. Therefore, air moisture is easily adsorbed, and the optical characteristics such as transmittance and phase difference easily change. The obliquely deposited layer has a low-density columnar structure and voids at a volume ratio of 20 to 30%. The voids of the obliquely deposited layer immediately after the formation thereof contain air (refractive index 1.0) as a main component, but take in air moisture (refractive index 1.3) at room temperature, thereby changing the optical characteristics. Exposure to an atmosphere of 100° C. or more causes evaporation of the moisture taken in and thus the air again becomes the main component. Thus, when the moisture amount in the obliquely deposited layer changes with the temperature, the refractive index of the voids is changed, and consequently the birefringence of the obliquely deposited layer is changed, thereby causing the factor of changing the transmittance and phase difference.

Therefore, the side surface of the obliquely deposited layer is preferably coated with a side protecting film composed of a silicone adhesive. The side protecting film can be formed by bonding the silicone-based adhesive so as to project to the side surface of the inorganic ½ wavelength plate 14 from the bonding surface thereof. Therefore, by forming the adhesive layer to extend to the side surface of the inorganic ½ wavelength plate 14, changes in the transmittance and phase difference can be decreased, and the bond strength between the inorganic ½ wavelength plate 14 and the polarizing beam splitter array 13 can be maintained.

Also, like in the polarizing beam splitter array 13, each of the reflecting prisms 12 is preferably bonded to the inorganic ½ wavelength plate 14 through a second adhesive layer 16 composed of a silicone-based adhesive. Thus, heat resistance and light resistance can be improved.

Further, a protective film having high compactness is preferably formed on the obliquely deposited layer. By forming the protective film, entrance of air moisture into the obliquely deposited layer can be prevented, and moisture resistance can be improved.

Examples which can be preferably used as a material of the protective film include inorganic compounds with low moisture permeability, such as $SiO_2$, $Ta_2O_5$, $TiO_2$, $Al_2O_3$, $Nb_2O_5$, LaO, $MgF_2$, and the like.

A method capable of forming a protective film with low moisture permeability by forming an inorganic compound at a high density can be used as a method for forming the protective film. An example of the method for forming the protective film is a chemical vapor deposition (CVD) method. When the protective film is formed by the CVD method, a substrate on which a birefringence layer has been formed is installed in a container at atmospheric pressure to medium vacuum (100 to $10^{-1}$ Pa), and a gaseous inorganic compound is fed as a material of the protective film into the container and is chemically reacted with the birefringence layer by applying energy of heat, plasma, light, or the like. The CVD method can form an inorganic compound at a high density on the birefringence layer, thereby forming a protective film with low moisture permeability. In place of the CVD method, any one of methods, for example, a plasma assisted vapor deposition method, a sputtering method, and the like, which can form an inorganic compound at a high density, may be used as the method for forming the protective film.

Also, an antireflection film (AR film) is preferably formed on the outgoing surface of each of the polarizing beam splitters 11 and the outgoing surface of the inorganic ½ wavelength plate 14. The antireflection film is, for example, a multi-layer thin film including a high refractive index film and a low refractive index film and can prevent surface reflection and improve transmissivity.

In the polarization conversion element configured as described above, light containing an S-wave and a P-wave and having random polarization directions is incident on a light incident surface. The incident light is first separated into the S-wave and the P-wave by the polarization separation layers 11a. The S-wave (or P-wave) is reflected by the polarization separation layers 11a to become substantially parallel to the incident surface of the polarizing beam splitter array 13, further reflected by the reflecting layers 12a, and is emitted substantially vertically to the outgoing surface of the polarizing beam splitter array 13. On the other hand, the P-wave (or S-wave) is transmitted through the polarization separation layers 11a, converted to the S-wave (or P-wave) by the inorganic ½ wavelength plate 14, and the emitted. Therefore, all light beams incident on the optical element and having random polarization directions are made S-wave (or P-wave) light beams and then emitted.

1-2. First Adhesive Layer and Second Adhesive Layer

Figure 3:
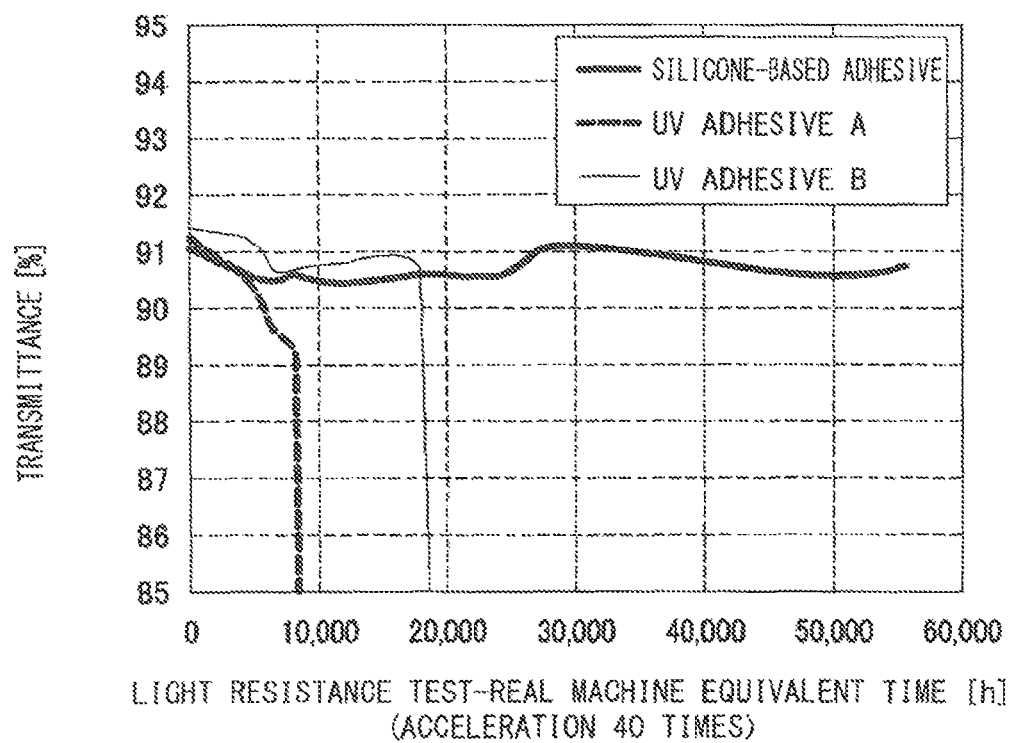
FIG. 3 is a graph showing the results of an accelerated light resistance test of a silicone-based adhesive and a UV adhesive.
Figure 4:
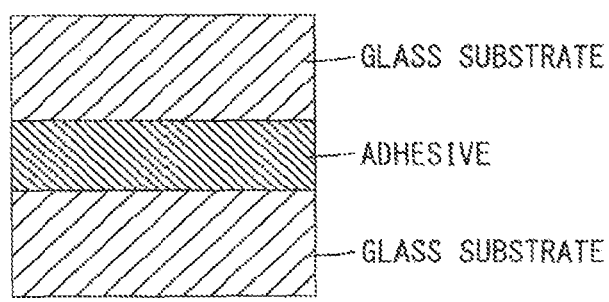
FIG. 4 is a cross-sectional view showing a configuration of a sample for an accelerated light resistance test.

Herein, heat resistance and light resistance of the first adhesive layer 15 and the second adhesive layer 16 are described. FIG. 3 is a graph showing the results of an accelerated light resistance test of a silicone-based adhesive and a UV adhesive. FIG. 4 is a cross-sectional view showing a configuration of a sample. The sample was formed by bonding together two glass substrates by using an adhesive. Also, the conditions of the accelerated light resistance test include a power density of about 40 times that of a high-brightness projector (real machine) and a substrate surface temperature of the sample of 70° C. That is, the test was performed at an acceleration of 40 times the real machine.

The graph shown in FIG. 3 shows that an adhesive layer of the sample using a UV adhesive A (manufactured by Kyoritsu Chemical Co., Ltd., XLV90) is turned yellow after a real machine equivalent time of about 5,000 hours has passed. Also, the sample was broken after a real machine equivalent time of about 6,000 hours has passed. Therefore, when a polarization conversion element using the UV adhesive A is used for a projector, the brightness of the projector is decreased after about 6,000 hours, and thus it is necessary to change the polarization conversion element to a new one at intervals of 5,000 hours.

In addition, an adhesive layer of the sample using a UV adhesive B (manufactured by Adell Co., Ltd., UT20) is turned yellow and broken after a real machine equivalent time of about 18,000 hours has passed. Therefore, also when a polarization conversion element using the UV adhesive B is used for a projector, it is necessary to change the polarization conversion element to a new one at intervals of 18,000 hours.

On the other hand, the sample using a silicone-based adhesive C (dimethyl silicone) showed no decrease in transmittance even after a real machine equivalent time of about 55,000 hours has passed. Therefore, by using the silicone-based adhesive, heat resistance and light resistance are improved, and the polarization conversion element can be used for a time of about 10 times or more as long as a usual polarization conversion element using the UV adhesive A.

1-3. Obliquely Deposited Layer Having Laminated Structure

Next, the obliquely deposited layer in the inorganic ½ wavelength plate is described. The obliquely deposited layer according to the embodiment of the present invention preferably has a laminated structure. In principle, the obliquely deposited layer having a plurality of layers can be determined to have a desired phase difference by adjusting the thickness thereof. The reflectance of each of the layers is proportional to the thickness thereof, and thus the thickness of each of the layers is preferably equal to or smaller than the wavelength used.

The dielectric material of the obliquely deposited layer is preferably an oxide of any one of Ta, Zr, Ti, Si, Al, Nb, and La, or a combination of thereof. Examples of the dielectric material include $Ta_2O_5$, $ZrO_2$, $TiO_2$, a material containing $Ta_2O_5$ and 5 to 15 wt % of $TiO_2$, and the like. By using such a dielectric material, the obliquely deposited layer having refractive indexes $n_{oblx}$ and $n_{obly}$ ($n_{oblx} > n_{obly}$) of 1.55 or more and 1.7 or less in the two orthogonal axes x and Y in a plane can be formed.

Figure 5:
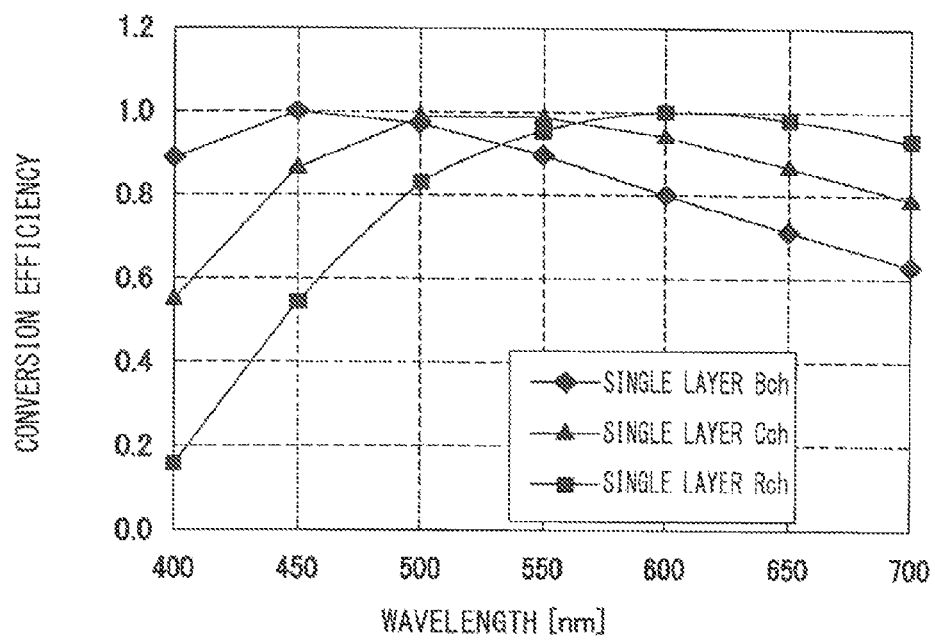
FIG. 5 is a drawing showing the results of simulation of a P→S conversion efficiency when an obliquely deposited layer includes a single layer.

FIG. 5 shows the results of simulation of a P→S conversion efficiency when the obliquely deposited layer of the inorganic ½ wavelength plate has a single layer. The obliquely deposited layer contains $Ta_2O_5$ fine particles with an axis which is inclined at 45 degrees with respect to incident light (normal to the substrate) and has a thickness which is determined to be optimum for each of the red wavelength region, the green wavelength region, and the blue wavelength region. FIG. 5 indicates that with the obliquely deposited layer including a single layer, a high efficiency of P→S conversion cannot be achieved within a wide wavelength region.

Figure 6:
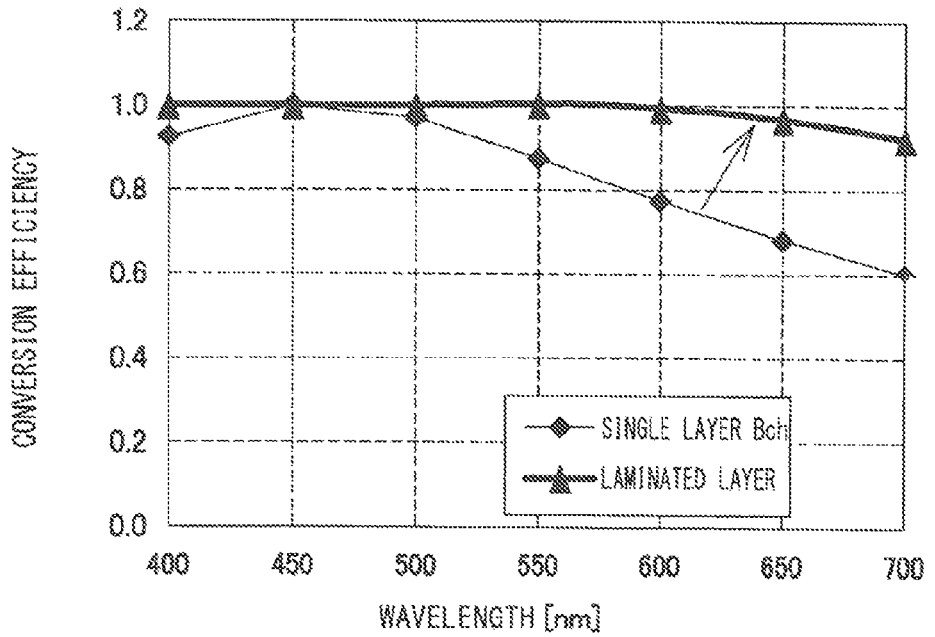
FIG. 6 is a drawing showing the results of simulation of a P→S conversion efficiency when an obliquely deposited layer includes a plurality of layers.

FIG. 6 shows the results of simulation of a P→S conversion efficiency when the obliquely deposited layer of the inorganic ½ wavelength plate has a plurality of layers. The obliquely deposited layer includes a first layer containing $Ta_2O_5$ fine particles with an axis which is inclined at 24 degrees with respect to incident light (normal to the substrate) and a second layer containing $Ta_2O_5$ fine particles with an axis which is inclined at 66 degrees with respect to incident light (normal to the substrate). FIG. 6 indicates that with the obliquely deposited layer including a plurality of layers (laminated layers), a high efficiency of P→S conversion can be achieved within a wide wavelength region.

1-4. Side Surface Protection of Inorganic ½ Wavelength Plate

Figure 7:
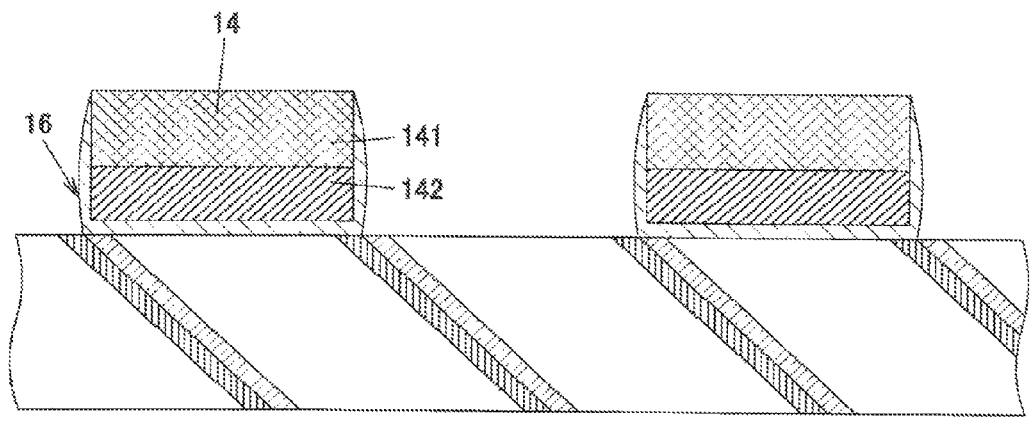
FIG. 7 is a cross-sectional view (1) schematically showing a bonding state of an inorganic ½ wavelength plate to a polarizing beam splitter array.
Figure 8:
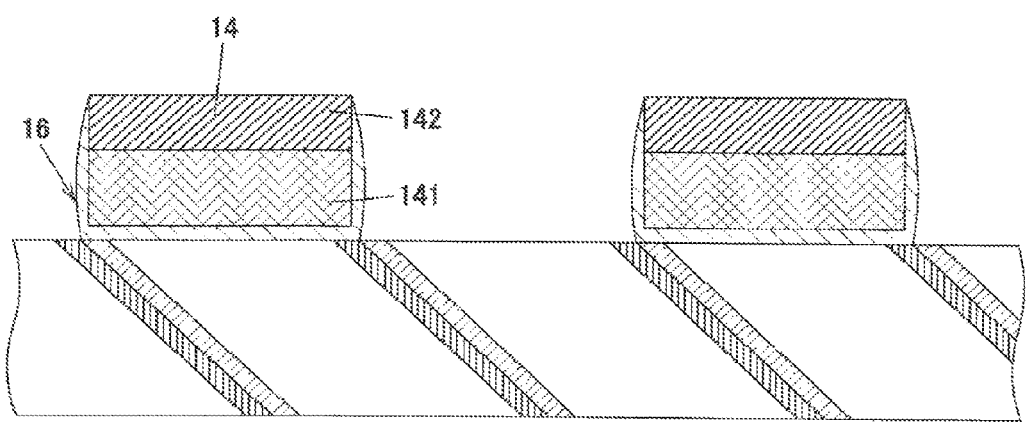
FIG. 8 is a cross-sectional view (2) schematically showing a bonding state of an inorganic ½ wavelength plate to a polarizing beam splitter array.

FIG. 7 and FIG. 8 are sectional views each schematically showing a bonding state of the inorganic ½ wavelength plate 14 to the polarizing beam splitter array 13. FIG. 7 and FIG. 8 indicate that the side surface of the inorganic ½ wavelength plate 14 is preferably protected by a silicone-based adhesive. That is, the second adhesive 16 is preferably formed over the side surface of the inorganic ½ wavelength plate 14. The side surface protecting film can be formed by bonding the silicone-based adhesive to project from the bond surface of the inorganic ½ wavelength plate 14 to the side surface thereof.

Also, FIG. 7 indicates that when the obliquely deposited layer 142 side of the inorganic ½ wavelength plate 14 is the bond surface, entrance of moisture into the obliquely deposited layer 142 having a highly porous structure can be prevented. In addition, FIG. 8 indicates that when the substrate 141 side of the inorganic ½ wavelength plate 14 is the bond surface, entrance of moisture into the obliquely deposited layer 142 can be prevented by forming a protective film on the obliquely deposited layer 142.

Thus, by protecting the side surface of the inorganic ½ wavelength plate 14, a decrease in transmittance can be prevented. Also, the bond strength between the inorganic ½ wavelength plate 14 and the polarizing beam splitter array 13 can be maintained.

1-5. Example 1

Figure 9:
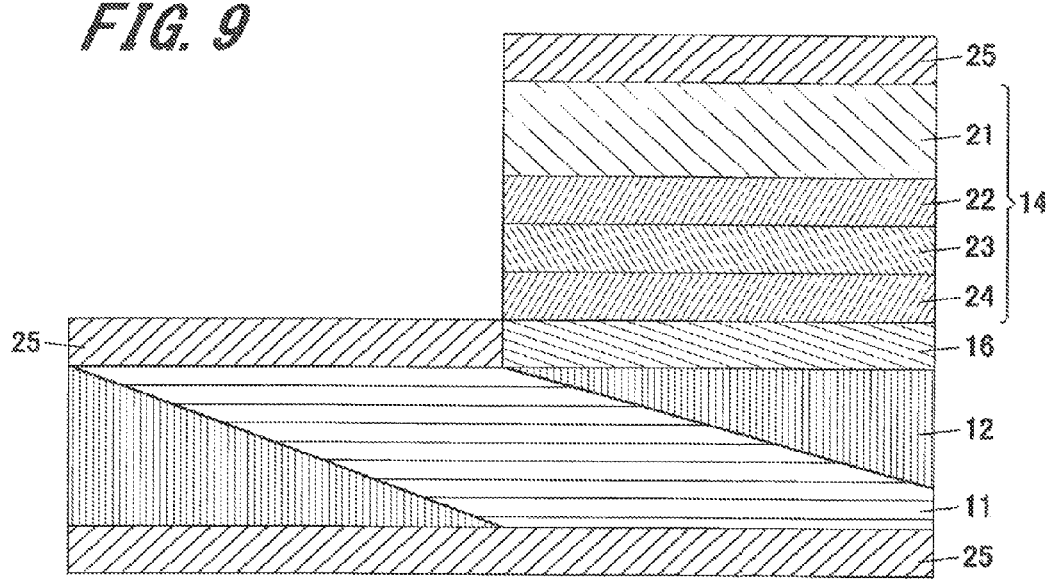
FIG. 9 is a sectional view schematically showing a configuration of example 1 of a polarization conversion element.

FIG. 9 is a cross-sectional view showing a configuration of example 1 of the polarization conversion element. In the polarization conversion element shown as example 1, the light-transmitting member of the polarizing beam splitter 11, the light-transmitting member of the reflecting prism 12, and the substrate of the inorganic ½ wavelength plate 14 are made of a glass substrate having a refractive index n of 1.46.

The inorganic ½ wavelength plate 14 includes a glass substrate 21, a first refractive-index adjusting layer 22, an obliquely deposited layer 23, and a second refractive-index adjusting layer 24, which are laminated in that order. Also, the obliquely deposited layer 23 side as the bond surface of the inorganic ½ wavelength plate 14 is bonded through the second adhesive layer 16 composed of a silicone-based adhesive (n: 1.41).

In the polarization conversion element shown as example 1, the incident surface of the polarizing beam splitter array 13 and the outgoing surface of the polarizing beam splitter 11 and the inorganic ½ wavelength plate 14 are made of glass substrates having the same refractive index, and thus a Final-AR film 25 that suppresses reflection at the interface with the air can be deposited with the same design on all surfaces.

Also, for example, when the polarization conversion element is applied to a projector for cinema used in a movie theatre, the surface is periodically cleaned by wiping because oil mist called "popcorn mist" adheres to the surface, but direct wiping out of the deposition surface can be prevented by bonding the deposition surface side with a silicone-based adhesive.

1-6. Example 2

Figure 10:
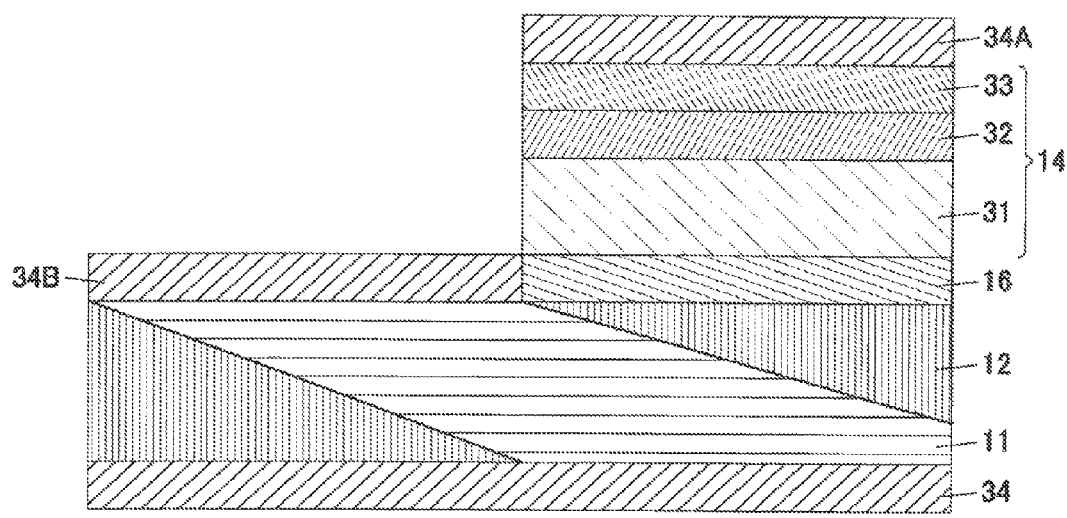
FIG. 10 is a sectional view schematically showing a configuration of example 2 of a polarization conversion element.

FIG. 10 is a cross-sectional view showing a configuration of example 2 of the polarization conversion element. Like in example 1, in the polarization conversion element shown as example 2, the light-transmitting member of the polarizing beam splitter 11, the light-transmitting member of the reflecting prism 12, and the substrate of the inorganic ½ wavelength plate 14 are made of a glass substrate having a refractive index n of 1.46.

The inorganic ½ wavelength plate 14 includes a glass substrate 31, a refractive-index adjusting layer 32, and an obliquely deposited layer 33, which are laminated in that order. Also, the glass substrate 31 side as the bond surface of the inorganic ½ wavelength plate 14 is bonded through the second adhesive layer 16 composed of a silicone-based adhesive (n: 1.41).

In the polarization conversion element shown as example 2, the outgoing surface of the polarizing beam splitter 11 and the outgoing surface of the inorganic ½ wavelength plate 14 have different refractive indexes, and thus a common AR film cannot be designed. Therefore, when an AR film 34A is formed on the surface of the inorganic ½ wavelength plate 14, it is necessary to form the film by masking the outgoing surface of the polarizing beam splitter 11 with a mask material, while when an AR film 34B is formed on the outgoing surface of the polarizing beam splitter 11, it is necessary to form the film by masking the surface of the inorganic ½ wavelength plate 14 with a mask material.

In the polarization conversion element shown as example 2, the glass substrate 31 side as the bond surface of the inorganic ½ wavelength plate 14 is bonded, and thus a refractive index adjusting film need not be formed on the obliquely deposited layer 33, thereby permitting thinning of the polarization conversion element.

1-7. Example 3

Figure 11:
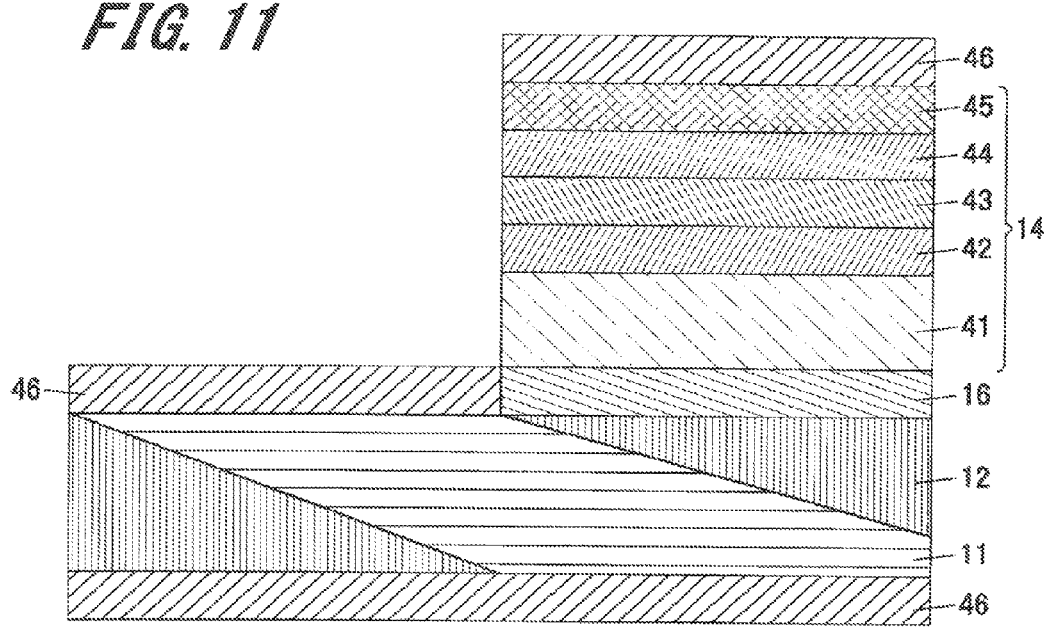
FIG. 11 is a sectional view schematically showing a configuration of example 3 of a polarization conversion element.

FIG. 11 is a cross-sectional view showing a configuration of example 3 of the polarization conversion element. Like in example 1, in the polarization conversion element shown as example 3, the light-transmitting member of the polarizing beam splitter 11, the light-transmitting member of the reflecting prism 12, and the substrate of the inorganic ½ wavelength plate 14 are made of a glass substrate having a refractive index n of 1.46.

The inorganic ½ wavelength plate 14 includes a glass substrate 41, a refractive-index adjusting layer 42, an obliquely deposited layer 43, a refractive-index adjusting layer 44, and a $SiO_2$ film 45, which are laminated in that order. Also, the glass substrate 41 side as the bond surface of the inorganic ½ wavelength plate 14 is bonded through the second adhesive layer 16 composed of a silicone-based adhesive (n: 1.41).

In the polarization conversion element shown as example 2, the outgoing surface of the polarizing beam splitter 11 and the outgoing surface of the inorganic ½ wavelength plate 14 have different refractive indexes, and thus a common AR film cannot be designed. However, in the polarization conversion element shown as example 3, the refractive-index adjusting layer 44 and the $SiO_2$ film 45 are formed on the obliquely deposited layer 43, and thus a Final-AR film 46 can be deposited with the same design on all surfaces. Also, since the $SiO_2$ film 45 is formed on the obliquely deposited layer 43 having a highly porous structure, entrance of moisture into the obliquely deposited layer 43 can be prevented, and thus moisture resistance can be improved.

2. Method for Manufacturing Polarization Conversion Element

Next, a method for manufacturing the polarization conversion element according to the embodiment is described. The method for manufacturing the polarization conversion element according to the embodiment includes the step of alternately bonding polarizing plates each having a conversion separation layer and reflecting plates each having a reflecting layer through a silicone-based adhesive, the step of cutting the laminated substrate at a predetermined angle with a normal line to the substrate to produce a polarizing beam splitter array, the step of selectively boding an inorganic ½ wavelength plate to the polarizing beam splitter array, and the step of depositing an antireflection film on the outermost surface.

Figure 12:
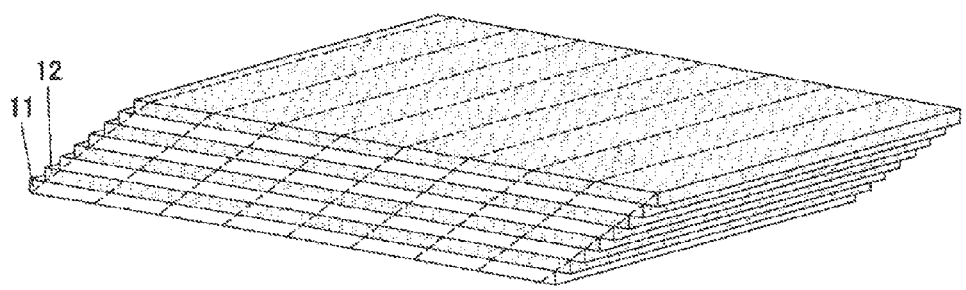
FIG. 12 is a schematic drawing illustrating a step of alternately bonding polarization plates and reflecting plates.

First, as shown in FIG. 12, the polarizing plates and the reflecting plates are alternately bonded while being deviated from each other by a predetermined width in a direction. Bonding is performed by using the silicone-based adhesive such as dimethyl silicone, methyl rubber, or the like.

Figure 13:
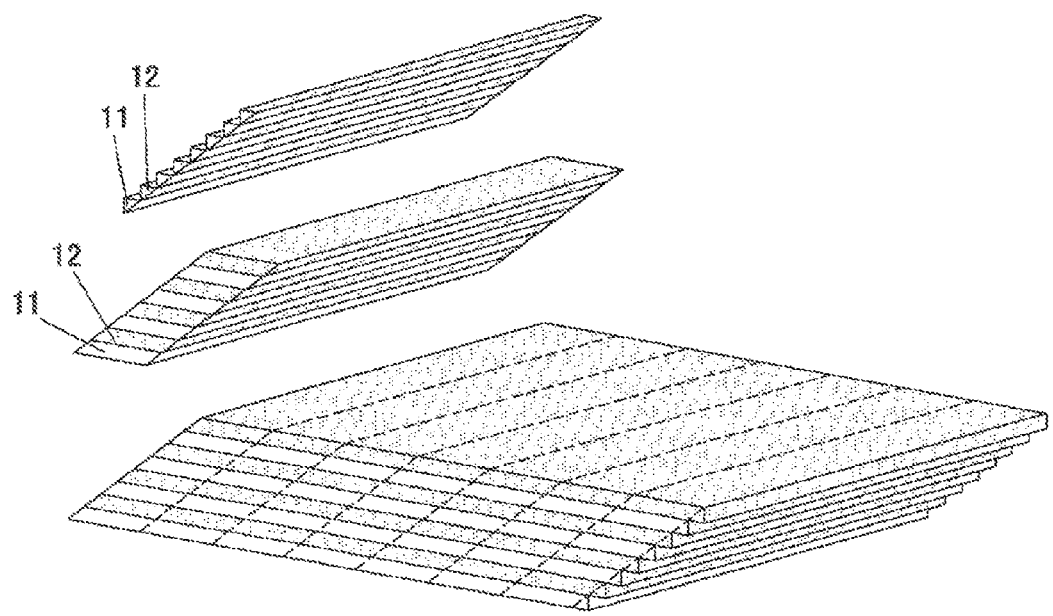
FIG. 13 is a schematic drawing illustrating a step of cutting a laminate of polarization plates and reflecting plates.

Next, as shown in FIG. 13, the resultant laminate is cut in the same direction as the direction in which the polarizing plates and the reflecting plates are laminated to be deviated from each other, thereby producing the polarizing beam splitter array in which polarizing beam splitters and reflecting prisms each having a parallelogram cross-section are alternately bonded to each other. Cutting can be performed by using a cutting device such as a glass scriber or the like.

Figure 14:
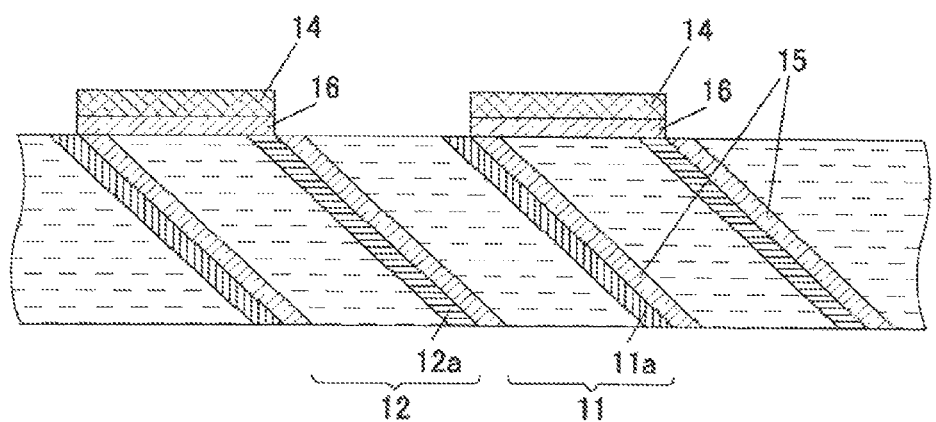
FIG. 14 is a schematic drawing illustrating a step of selectively bonding an inorganic ½ wavelength plate to a polarizing beam splitter array.

Next, as shown in FIG. 14, the inorganic ½ wavelength plate 14 is selectively provided on the polarizing beam splitter array. The inorganic ½ wavelength plate 14 is preferably provided by using a silicone-based adhesive such as dimethyl silicone, methyl rubber, or the like. Also, the inorganic ½ wavelength plate 14 is preferably bonded so that the silicone-based adhesive projects from the bond surface to the side surface. Thus, entrance of moisture into the obliquely deposited layer of the inorganic ½ wavelength plate 14 can be prevented. Also, bonding strength between the inorganic ½ wavelength plate 14 and the polarizing beam splitter array can be maintained.

In addition, for the purpose of improving transmittance, an antireflection film (AR film) is preferably deposited on both the front and back surfaces by sputtering. The AR film may be a multilayer film including a high-refraction film and a low-refraction film which are generally used.

When the polarizing plates and the reflecting plates are bonded to each other as described above, using the silicone-based adhesive containing dimethyl silicone, methyl rubber, or the like can produce a polarization conversion element having excellent heat resistance and light resistance.

3. Optical Device

Figure 15:
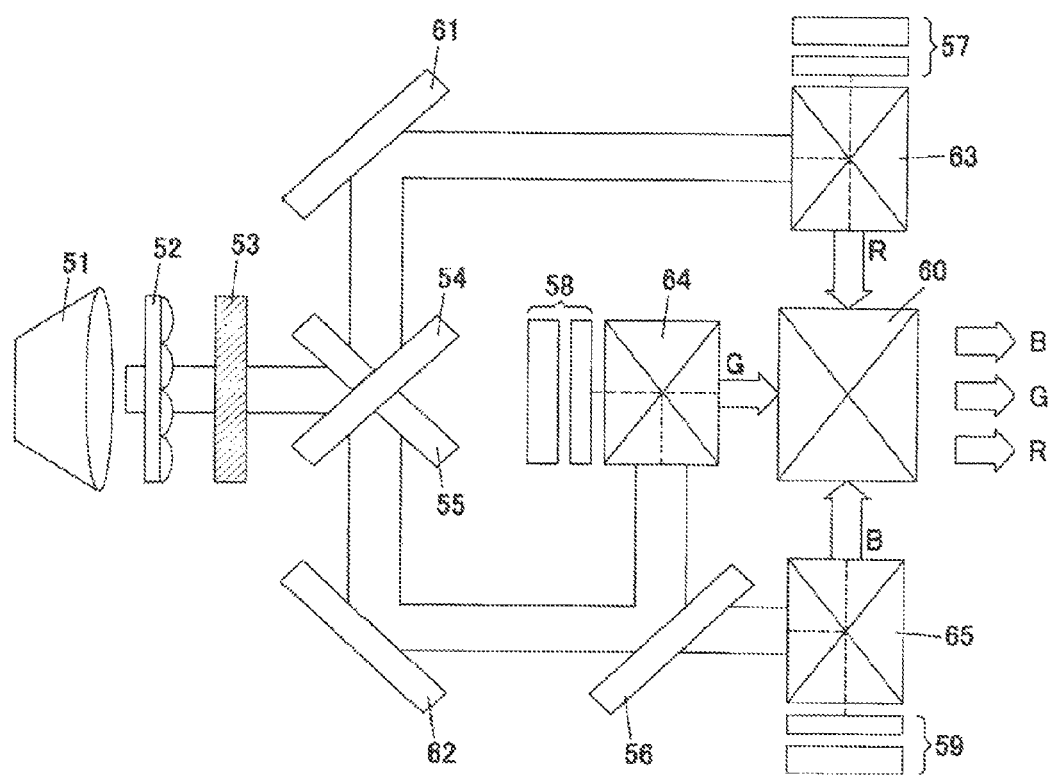
FIG. 15 is a drawing showing an optical system of a liquid crystal projector.

Next, an example of application to an optical device is described with reference to a liquid crystal projector. FIG. 15 is a drawing showing an optical system of a liquid crystal projector. The projector includes a light source 51, a fly-eye lens 52 that makes a light beam substantially parallel, a polarization conversion element 53 that convers random polarization to a predetermined polarization direction, color separation mirrors (dichroic mirror) 54, 55, and 56 that separate the light into red light, green light, and blue light, reflective liquid crystal display panels 57, 58, and 59 for red, green, and blue displays, respectively, referred to as "LCOS (Liquid Crystal on Silicon)", in which a liquid crystal is formed on a silicon substrate, a color synthesis prism 60 that combines the three color lights to form a color image, mirrors 61 and 62, and PBS (polarizing beam splitter) 63, 64, 65.

A light beam emitted from, for example, a white lamp serving as the light source 51 is made substantially parallel by the fly-eye lens 52, and random polarization is converted to a predetermined polarization direction (P-wave or S-wave) by the polarization conversion element 53. The light beam converted to the predetermined polarization direction is separated into red light and green and blue lights by the color separation mirrors 54 and 55. The green and blue lights are reflected by the mirror 62 and separated into green light and blue light by the color separation mirror 56. The red light is reflected by the mirror 61 and is incident on the PBS 63, and the green light and the blue light are incident on the PSB 64 and 65, respectively.

The PBS 63, 64, and 65 reflect only a linearly polarized light in a vibration direction, and reflected lights are incident on the reflective liquid crystal display panels 57, 58, and 59 for red color, green color, and blue color displays, respectively. The image lights emitted from the reflective liquid crystal display panels 57, 58, and 59 are incident again on the PBS 63, 64, and 65, respectively, and detected. The linearly polarized lights transmitted through the PBS 63, 64, and 65 are combined by the color synthesis prism 60 to project a color image on a screen by a projection lens.

The optical device including the polarization conversion element 53 having the configuration described above is improved in heat resistance and light resistance, and can prevent deterioration such as burning or the like by heat or light due to higher brightness. Also, in the polarization conversion element 53, oil mist called "popcorn oil" adheres to the surface, and thus strong pressure is applied to the surface by periodic wipe cleaning. However, excellent impact resistance can be achieved by a cushion effect due to the function of the silicone-based adhesive layer.

REFERENCE SIGNS LIST

11 polarizing beam slitter, 12 reflecting prism, 13 polarizing beam splitter array, 14 inorganic ½ wavelength plate, 15 first adhesive layer, 16 second adhesive layer, light source, 52 fly-eye lens, 53 polarization conversion element, 54, 55, 56 color separation mirror, 57, 58, 59 reflective liquid crystal display panel, 60 color synthesis prism, 61, 62 mirror, 63, 64, 65 PBS

The invention claimed is:
1. A polarization conversion element comprising:
   a polarizing beam splitter array in which first light-transmitting members each having a polarization separation layer for transmitting one of a P wave and a S wave and reflecting the other of a P wave and a S wave, and second light-transmitting members each having a reflecting layer for reflecting the other of the P wave and the S wave reflected by the polarization separation layer are alternately bonded to each other through a first adhesive layer composed of a silicone-based adhesive, the other of the P wave and the S wave incident on an incident surface and reflected by the polarization separation layer being reflected by the reflecting layer to an outgoing surface; and
   an inorganic ½ wavelength plate that is provided selectively on the outgoing surface of the polarizing beam splitter array and that comprises an obliquely deposited layer for converting the one of the P-wave and the S-wave transmitted through the polarization separation layer, to the other of the P wave and the S wave, the obliquely deposited layer composed of a dielectric material,
   wherein the obliquely deposited layer is a flat layer,
   wherein a side surface of the obliquely deposited layer is coated with a protecting film composed of a silicone-based adhesive, and
   wherein a side surface of the inorganic ½ wavelength plate is coated with the protecting film in a thickness direction thereof, and a top surface of the inorganic ½ wavelength plate is not coated with the protecting film.
2. The polarization conversion element according to claim 1, wherein the polarizing beam splitter array is bonded to the inorganic ½ wavelength plate through a second adhesive layer composed of a silicone-based adhesive.
3. The polarization conversion element according to claim 2, wherein
   the inorganic ½ wavelength plate comprises a glass substrate, a first refractive index adjusting layer, the obliquely deposited layer, and a second refractive index adjusting layer which are deposited in that order, and
   the second refractive index adjusting layer is bonded to the polarizing beam splitter array through the second adhesive layer.
4. The polarization conversion element according to claim 2, wherein
   the inorganic ½ wavelength plate comprises a glass substrate, a refractive index adjusting layer, and the obliquely deposited layer which are deposited in that order, and
   the glass substrate is bonded to the polarizing beam splitter array through the second adhesive layer.
5. The polarization conversion element according to claim 2, wherein
   the inorganic ½ wavelength plate comprises a glass substrate, a first refractive index adjusting layer, the obliquely deposited layer, a second refractive index adjusting layer, and a $SiO_2$ layer which are deposited in that order, and
   the glass substrate is bonded to the polarizing beam splitter array through the second adhesive layer.
6. The polarization conversion element according to claim 2, wherein the silicone-base adhesive contains dimethyl silicone or methyl rubber.
7. The polarization conversion element according to claim 1, wherein the silicone-base adhesive contains dimethyl silicone or methyl rubber.
8. An optical device comprising the polarization conversion element according to claim 1.
9. A polarization conversion element comprising:
   a polarizing beam splitter array in which first light-transmitting members each having a polarization separation layer for transmitting one of a P wave and a S wave and reflecting the other of the P wave and the S wave, and second light-transmitting members each having a reflecting layer for reflecting the other of the P wave and the S wave reflected by the polarization separation layer are alternately bonded to each other through a first adhesive layer composed of a silicone-based adhesive, the other of the P wave and the S wave incident on an incident surface and reflected by the polarization separation layer being reflected by the reflecting layer to an outgoing surface; and
   an inorganic ½ wavelength plate that is provided selectively on the outgoing surface of the polarization beam splitter array and that comprises an obliquely deposited layer for converting the one of the P wave and the S wave transmitted through the polarization separation layer, to the other of the P wave and the S wave, the obliquely deposited layer composed of a dielectric material,
   wherein an antireflection film is formed on the outermost surface,
   wherein the obliquely deposited layer is a flat layer, and
   wherein a side surface of the inorganic ½ wavelength plate is coated with a protecting film in a thickness direction thereof, and a top surface of the inorganic ½ wavelength plate is not coated with the protecting film.

10. The polarization conversion element according to claim 9, wherein the polarizing beam splitter array is bonded to the inorganic ½ wavelength plate through a second adhesive layer composed of a silicone-based adhesive.

11. The polarization conversion element according to claim 9 or 10, wherein the silicone-based adhesive contains dimethyl silicon or methyl rubber.

12. The polarization conversion element according to claim 10, wherein the inorganic ½ wavelength plate comprises a glass substrate, a first refractive index adjusting layer, the obliquely deposited layer, and a second refractive index adjusting layer which are deposited in that order, and the second refractive index adjusting layer is bonded to the polarizing beam splitter array through the second adhesive layer.

13. The polarization conversion element according to claim 10, wherein the inorganic ½ wavelength plate comprises a glass substrate, a refractive index adjusting layer, and the obliquely deposited layer which are deposited in that order, and the glass substrate is bonded to the polarizing beam splitter array through the second adhesive layer.

14. The polarization conversion element according to claim 10, wherein the inorganic ½ wavelength plate comprises a glass substrate, a first refractive index adjusting layer, the obliquely deposited layer, a second refractive index adjusting layer, and a $SiO_2$ layer which are deposited in that order, and the glass substrate is bonded to the polarizing beam splitter array through the second adhesive layer.

15. The polarization conversion element according to claim 9, wherein a side surface of the obliquely deposited layer is coated with a protecting film composed of a silicone-based adhesive.

16. An optical device comprising the polarization conversion element according to claim 9.

* * * * *